US010255258B2

(12) United States Patent
Corcoran

(10) Patent No.: US 10,255,258 B2
(45) Date of Patent: Apr. 9, 2019

(54) MODIFYING AN ELECTRONIC FORM USING METRICS OBTAINED FROM MEASURING USER EFFORT

(71) Applicant: Avoka Technologies Pty Ltd, Manly, New South Wales (AU)

(72) Inventor: Derek John Corcoran, Newtown (AU)

(73) Assignee: Avoka Technologies Pty Ltd (AU)

(*) Notice: Subject to any disclaimer, the term of this patent is extended or adjusted under 35 U.S.C. 154(b) by 372 days.

(21) Appl. No.: 15/136,070

(22) Filed: Apr. 22, 2016

(65) Prior Publication Data

US 2016/0314110 A1 Oct. 27, 2016

Related U.S. Application Data

(60) Provisional application No. 62/151,814, filed on Apr. 23, 2015.

(51) Int. Cl.
*G06F 17/24* (2006.01)
(52) U.S. Cl.
CPC .................. *G06F 17/243* (2013.01)
(58) Field of Classification Search
None
See application file for complete search history.

(56) References Cited

U.S. PATENT DOCUMENTS

| 9,563,271 | B1* | 2/2017 | Ben-Yair | G06F 3/013 |
| 2005/0054381 | A1* | 3/2005 | Lee | G06F 3/011 |
| | | | | 455/557 |
| 2007/0244739 | A1* | 10/2007 | Soito | G06Q 30/02 |
| | | | | 705/7.29 |
| 2009/0037378 | A1* | 2/2009 | Moor | G06F 17/243 |
| 2011/0004837 | A1* | 1/2011 | Copland | G06F 3/0482 |
| | | | | 715/765 |
| 2013/0097480 | A1* | 4/2013 | Allison | G06F 17/243 |
| | | | | 715/223 |
| 2015/0149877 | A1* | 5/2015 | Ling, III | G06F 17/243 |
| | | | | 715/221 |
| 2016/0110280 | A1* | 4/2016 | Singh | G06F 3/04842 |
| | | | | 715/762 |
| 2017/0228355 | A1* | 8/2017 | Ling, III | G06F 17/243 |

* cited by examiner

*Primary Examiner* — Asher D Kells
(74) *Attorney, Agent, or Firm* — Bracewell LLP; Linda Morgan

(57) ABSTRACT

A method, processing system and computer readable medium are disclosed for modifying a form. In one particular aspect, the method includes the a processing system performing the following steps: transferring form data indicative of at least part of a form to a plurality of user devices; receiving, from the plurality of user devices, user interaction data indicative of user interaction with at least part of the form; analyzing the user interaction data to determine a user effort metric in relation to user interaction with at least part of the form; and outputting, based on the user effort metric, one or more recommended modifications to the form.

24 Claims, 7 Drawing Sheets

MODIFYING AN ELECTRONIC FORM USING METRICS OBTAINED FROM MEASURING USER EFFORT

CROSS-REFERENCE TO RELATED APPLICATIONS

The present application claims the benefit of priority from U.S. Provisional Patent Application No. 62/151,814 filed Apr. 23, 2015, the content of which is incorporated by reference.

TECHNICAL FIELD

The present invention relates to a method, system, computer readable medium and one or more computer programs for modifying an electronic form using metrics obtained from measuring user effort.

BACKGROUND

In the field of online data entry (also described here as form-based transactions), a constant goal for the organization is to improve conversion rates, or stated in reverse, to reduce abandonment rates. Measurements have demonstrated that a large proportion of the users who begin the process of completing the transaction, abandon it before completion. This varies based on the type of form, the complexity of completing it, and the motivation of the user. An abandoned transaction can result in either a loss of revenue (if the customer goes to a competitor), or higher cost to process if the customer chooses a more expensive channel, such as the call center or a branch office.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavor to which this specification relates.

SUMMARY

In a first aspect there is provided a method performed by a processing system including:
transferring form data indicative of at least part of a form to a plurality of user devices;
receiving, from the plurality of user devices, user interaction data indicative of user interaction with at least part of the form, wherein the user interaction data is stored in a data store;
analyzing the user interaction data to determine a user effort metric in relation to user interaction with at least part of the form; and
outputting, based on the user effort metric, one or more recommended modifications to the form.

In certain embodiments, the method includes:
receiving form stage definition data defining a sequences of stages that are presentable within the form; and
storing the form stage definition data in the data store.

In certain embodiments, the method includes:
receiving form step definition data indicative of a series of steps to be executed by a user completing the form for each stage of the form; and
storing the form step definition data in the data store.

In certain embodiments, the method includes:
associating metadata stored in the data store with the respective form stages and steps of the form.

In certain embodiments the stages and steps of the form are be defined in XML, wherein the XML includes at least one XML tag associating at least some of the meta-data stored in the data store with at least some of the form stages and the form steps.

In certain embodiments, the method includes receiving, at the processing system, customisation data for determining a step effort metric representing the effort associated with a user providing the requested data when completing the form.

In certain embodiments, the method includes the processing system receiving one or more attribute values defined for one or more form fields of the form, wherein the one or more attribute values include at least one of:
a field type value, wherein a field type metric is stored in the data store;
a field length value indicative of a textual length of the field;
a mandatory value indicative of whether the field needs to be completed in order to submit the form;
a prefill occurrence value indicative of the likelihood that field is prefillable; and
an information difficulty value indicative of the difficulty of providing information requested for the field.

In certain embodiments, the method includes:
calculating for at least some of the steps of the form the respective step effort value, wherein each calculated step effort value is calculated based upon at least some of the one or more attribute values that are stored in the data store;
calculating for at least some of the stages of the form a stage effort value, wherein each stage effort value of each respective stage is calculated based upon the respective step effort value of each fields of the respective stage and at least some of the user interaction data; and
calculating the user effort metric based upon the respective stage effort values of each stage of the form.

In certain embodiments, the step effort metric is calculated according to:

$$\text{Step Effort Metric} = FT \cdot FLF \cdot PFO \cdot ID$$

where:
FT is the field type effort value;
FLF is the field length value;
PFO is prefill occurrence value; and
ID is the information difficulty value.

In certain embodiments, the calculating of each stage effort step is based upon a weighted sum of the one or more step effort values, wherein at least some of the step effort values are weighted according a step weight value stored in the data store.

In certain embodiments, the calculating of each stage effort step is based upon a number of occurrences which each step of the respective stage has been presented to a form completing user.

In certain embodiments, each stage effort metric is calculated according to:

$$\text{Stage Effort Metric} = \sum_{j=1}^{n} O_i E_i W_i$$

where:
j is a step;
n is a number of steps in the respective stage;
O is an occurrence value of the respective step;

E is the step effort metric associated with the respective step; and

W is a weighting for the respective step

In certain embodiments, the calculating of the user effort metric is based upon a weighted sum of the one or more stage effort values, wherein at least some of the stage effort values are weighted according a stage weight value stored in the data store.

In certain embodiments, the calculating of the user effort metric is based upon a number of occurrences which each stage of the respective stage has been presented to a form completing user.

In certain embodiments, the user effort metric is calculated according to:

$$\text{User Effort Metric} = \sum_{i=1}^{n} O_i E_i W_i$$

where:
i is a stage number;
n is a total number of stages;
O is an occurrence metadata value for the respective stage;
E is the stage effort metric for the respective stage; and
W is the weighting for the respective stage.

In certain embodiments, the method includes applying one or more rules defining one or more acceptable modifications to automatically determine the one or more recommended modifications to the form.

In certain embodiments, the method includes the processing system automatically implementing the one or more modifications to the form.

In certain embodiments, the method includes:
implementing the one or more modifications to the form thereby generating the modified form
determining a user effort metric for the modified form;
comparing the user effort metric for the form and the user effort metric for the modified form; and
in the event that the user effort metric of the modified form has not improved compared to the form, reverting the one or more modifications to the form.

In a second aspect there is provided a processing system configured to:
transfer form data indicative of at least part of a form to a plurality of terminals;
receive, from the plurality of user devices, user interaction data indicative of user interaction with at least part of the form, wherein the user interaction data is stored in a data store;
analyze the user interaction data to determine a user effort metric in relation to user interaction with at least part of the form; and
output, based on the user effort metric, one or more recommended modifications to the form.

In a third aspect there is provided a non-transient computer readable medium including program instructions for configuring a processing system to:
transfer form data indicative of at least part of a form to a plurality of user devices;
receive, from the plurality of user devices, user interaction data indicative of user interaction with at least part of the form, wherein the user interaction data is stored in a data store;
analyze the user interaction data to determine a user effort metric in relation to user interaction with at least part of the form; and
output, based on the user effort metric, one or more recommended modifications to the form.

Other aspects and embodiments will be appreciated throughout the detailed description of the one or more preferred embodiments.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EXAMPLE EMBODIMENTS

The following modes, given by way of example only, are described in order to provide a more precise understanding of the subject matter of a preferred embodiment or embodiments.

Figure 1:
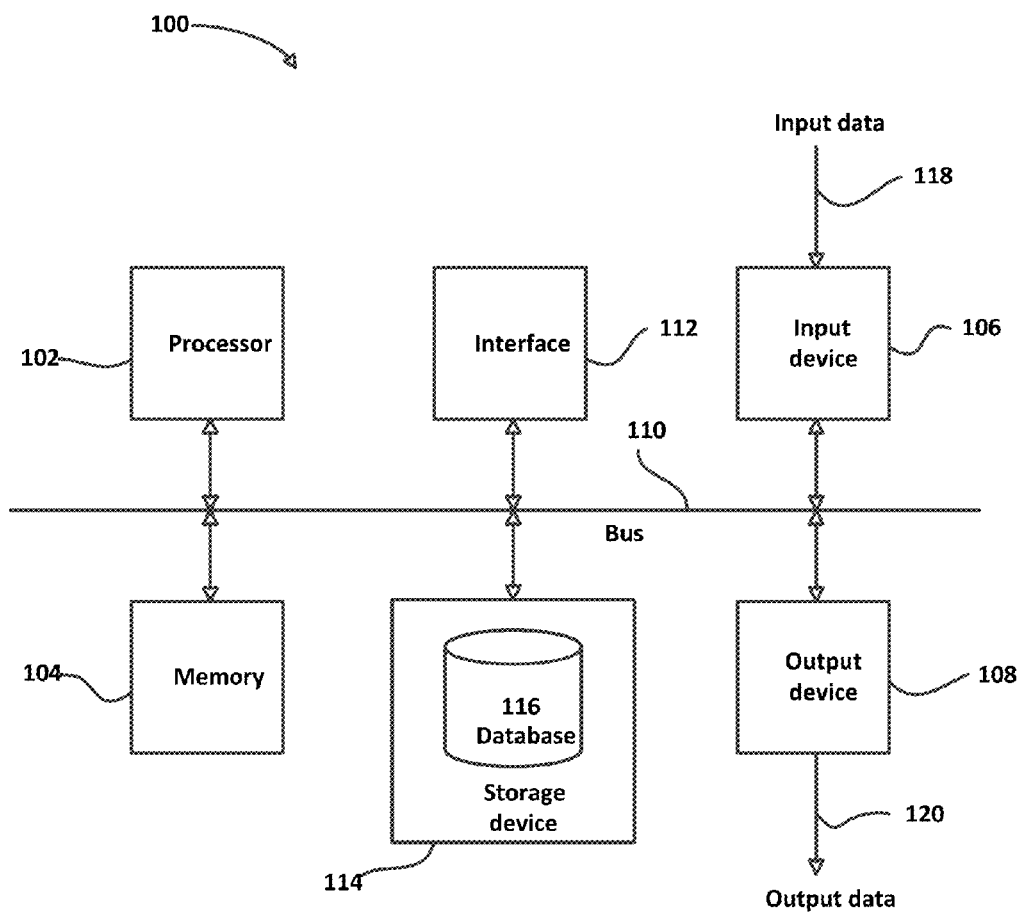
FIG. 1 illustrates a functional block diagram of an example processing device that can be utilized to embody or give effect to a particular embodiment.

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilizing output device 108. More than one input device 106 and/or output device 108 can be provided. It should be appreciated that the processing device 100 may be any form of terminal, PC, laptop, notebook, tablet, smart phone, specialized hardware, or the like.

Figure 2:
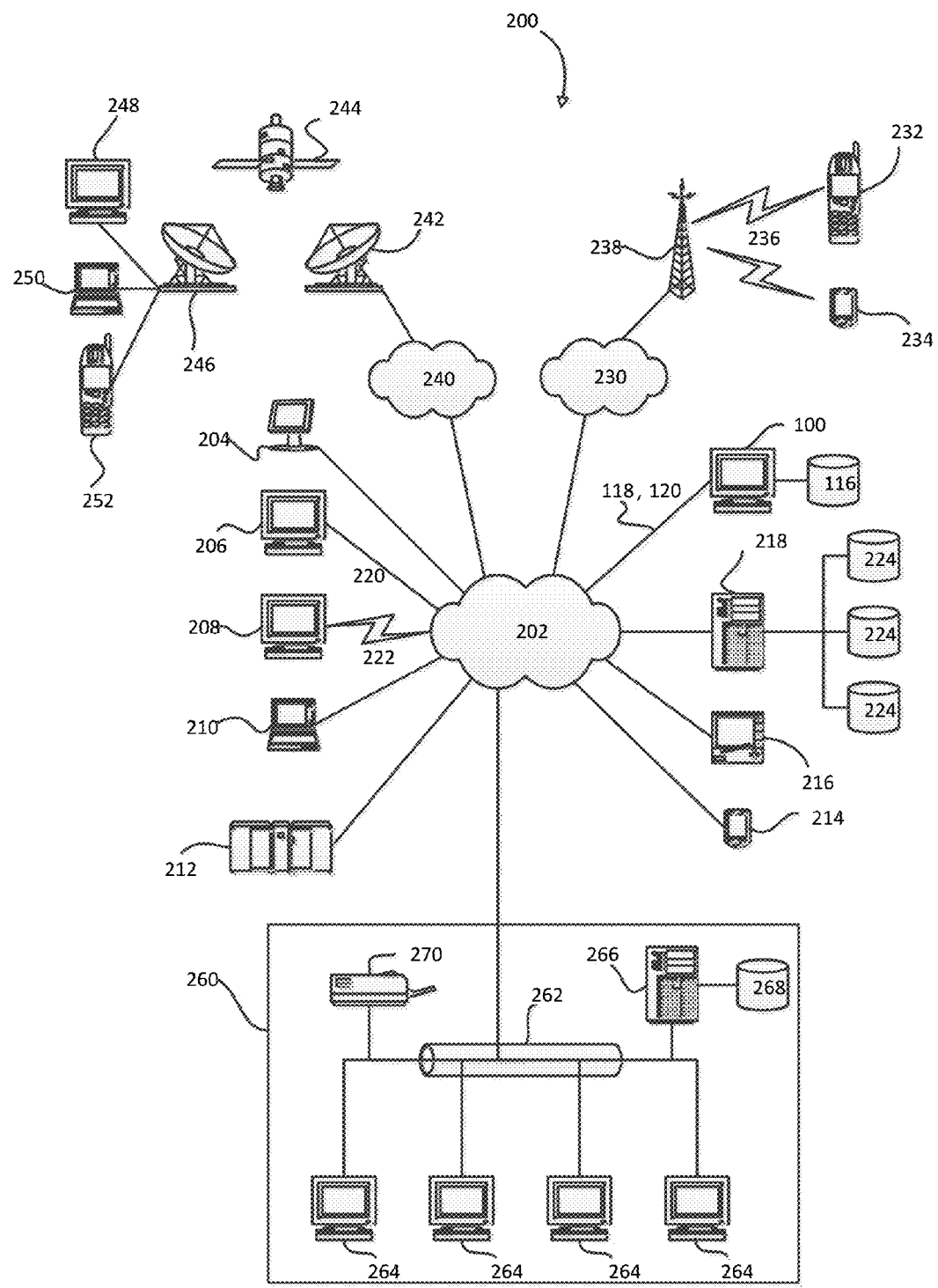
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilizing wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA, 3G, 4G, etc., networks, and may be wholly or partially wired, including for example optical fiber, or wireless networks, depending on a particular implementation.

Figure 3:
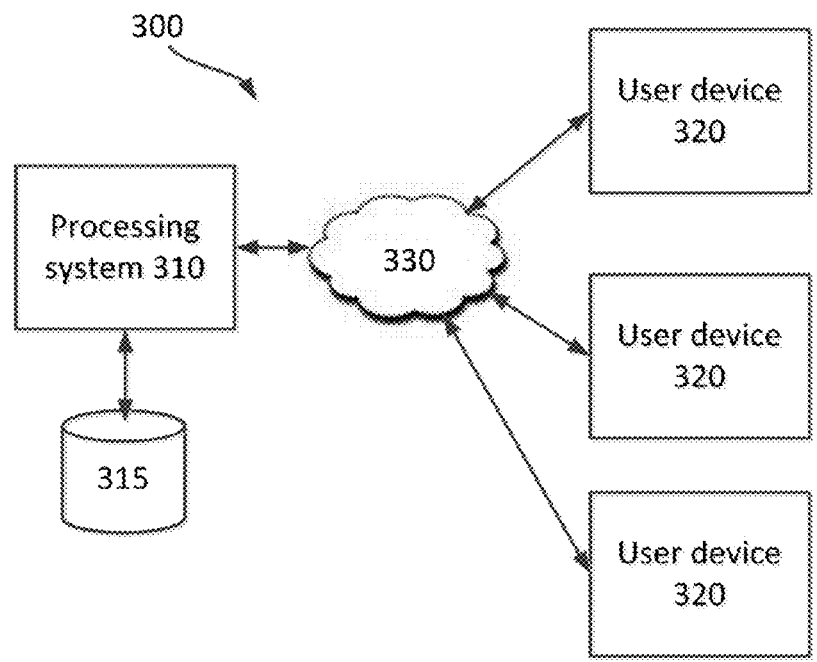
FIG. 3 is a functional block diagram representing an example system for modifying an electronic form.

Referring to FIG. 3 there is shown a functional block diagram representing a system diagram for modifying an electronic form.

In particular, the system 300 includes a processing system 310 which is in data communication with one or more user devices 320. The processing system 310 and user devices 320 may be provided in the form of processing system 100. The user devices 320 are generally in communication with the processing system via one or more computer networks 330 which can include the Internet.

Figure 4:
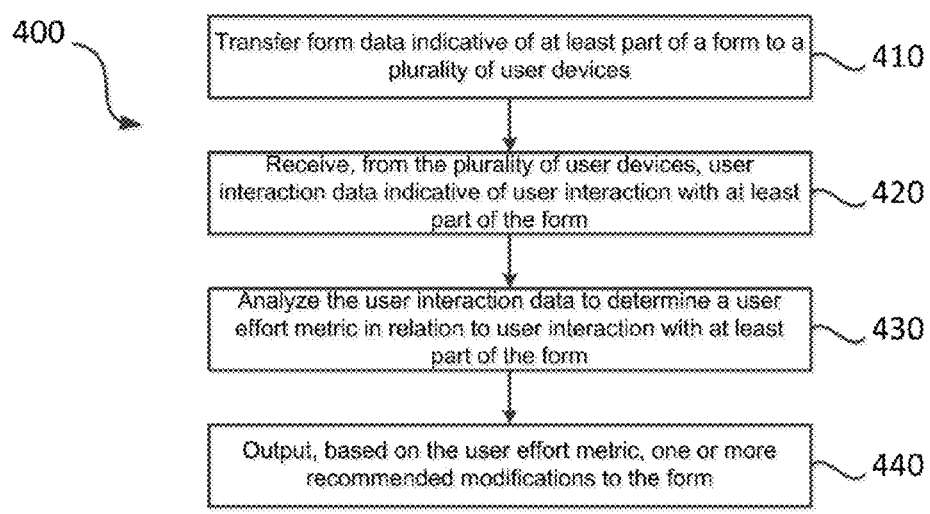
FIG. 4 is a flowchart representing a method for modifying an electronic form.

Referring to FIG. 4 there is shown a flowchart representing a method 400 for modifying an electronic form.

In particular, at step 410, the method 400 includes the processing system 310 transferring form data indicative of at least part of a form to a plurality of user devices 320.

At step 420, the method 400 includes the processing system 310 receiving, from the plurality of user devices 320, user interaction data indicative of user interaction with at least part of the form.

At step 430, the method 400 includes the processing system 310 analyzing the user interaction data to determine a user effort metric in relation to user interaction with at least part of the form.

At step 440, the method 400 includes the processing system 310 outputting, based on the user effort metric, one or more recommended modifications to the form.

Figure 5:
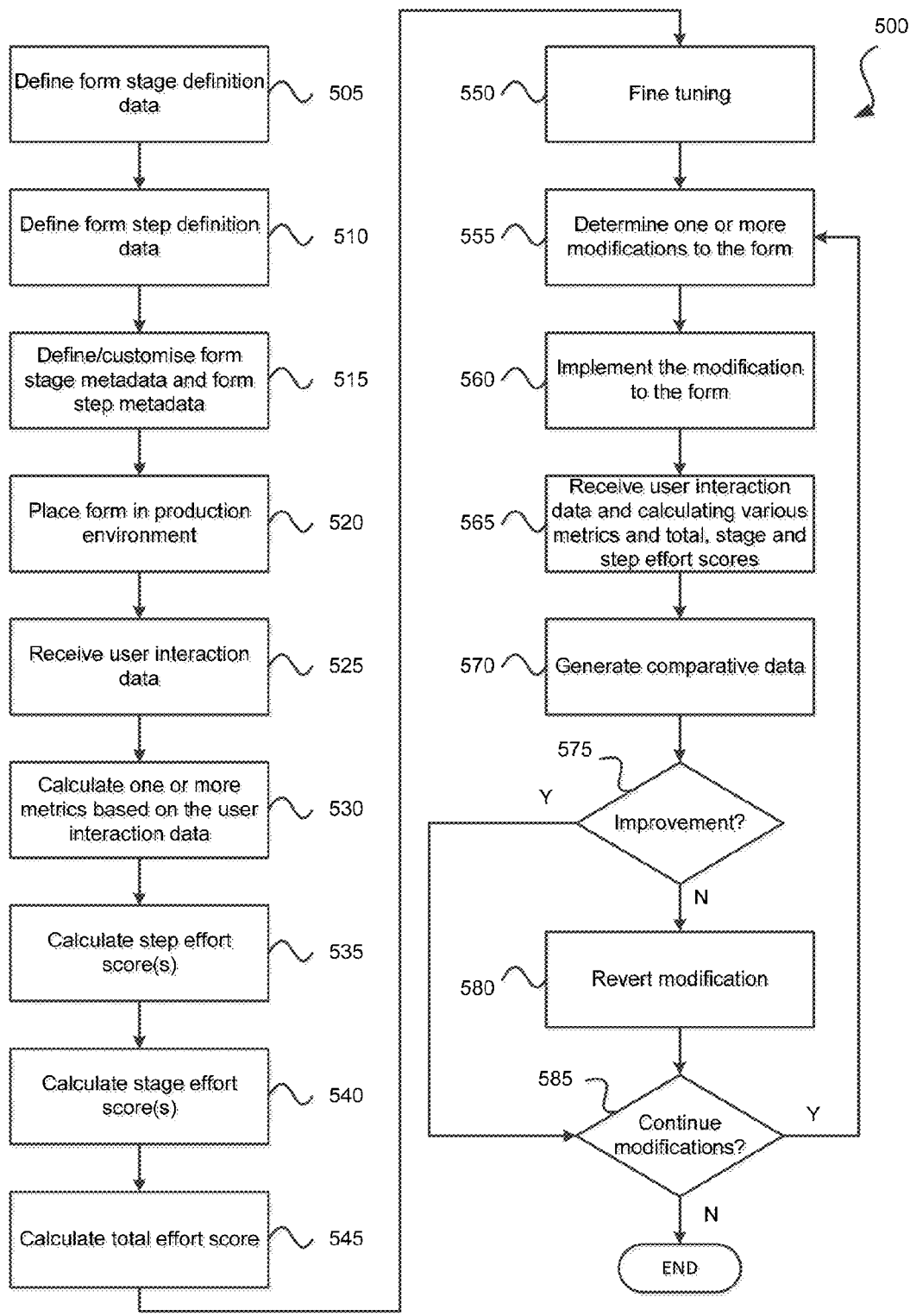
FIG. 5 is a flowchart representing a more detailed method for modifying an electronic form.

Referring to FIG. 5 there is shown a further flowchart representing a more detailed method 500 for modifying a form, and more specifically optimizing a form based on user interaction.

Figure 6:
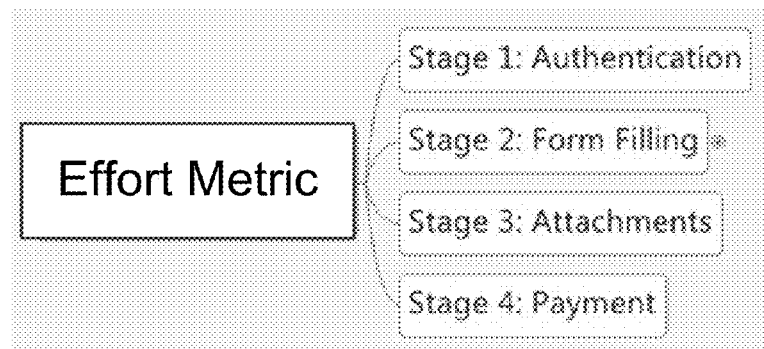
FIG. 6 is a block diagram of an example series of stages being defined for a form.

In particular, at step 505 the method 500 includes a form creation user interacting with form editing computer program executable upon the processing system 310 to define form stage definition data for a new form. In particular, the form creation user can define a sequence of stages that can be presented within the form. A block diagram outlining an example sequence of stages defined for a form is depicted in FIG. 6. The form stage definition data can be stored in a data store 315 accessible by the processing system 310. The data store 315 may be maintained by another processing system provided in the form of processing system 100.

Figure 7:
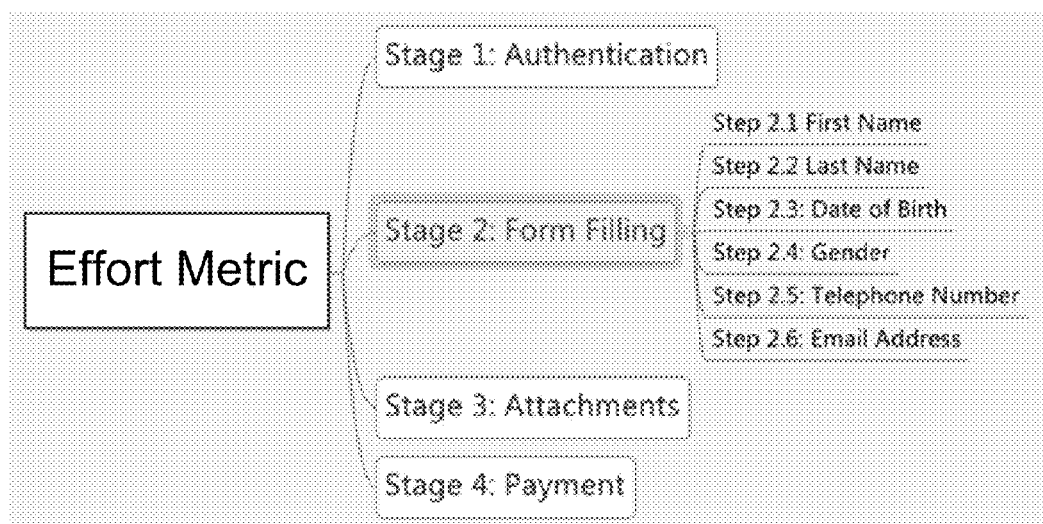
FIG. 7 is a block diagram of an example series of steps being defined in relation to a stage of a form.

At step 510, the method 500 includes the form creation user interacting with the form editing computer program executable upon the processing system 310 to define form step definition data indicative of a series of steps to be executed by a user completing the form for each stage of the form. In one form, the form editing computer program may present a field definition editor to enable the user to define one or more steps which are to be presented as form fields within the form. However, it will be appreciated that one or more steps may not necessarily be presented as a form field in the form. A block diagram outlining an example sequence of steps defined for a stage is depicted in FIG. 7.

In one form, when the user defines the form stage definition data and the form step definition data, the processing system associates or inherits exiting metadata stored in the data store 315 for the respective form stages and steps of the form. In one form, the stages and steps of the form may be defined in XML. An XML tag associates exiting meta-data stored in the data store 315 which the respective form stage or form step.

At step 515, the method 500 includes the user defining and/or customizing form stage metadata and form step metadata in relation to the form. In particular, for certain form field types of form stage types, particular metadata may be inherited from metadata already stored in the data store 315. The user can override metadata values that are stored in the data store 315 such that the customised meta-data values for the current form are stored in the data store 315. Additionally, the user may define new meta-data values which may not stored in the data store 310. The customised meta-data values can be stored in the data store 315 with a unique identity associated with the form stage or form step. More specifically, in relation to the steps of a defined stage of a form, the user can define, directly or indirectly, a step effort metric which is a numerical value that is indicative of the effort associated with a user providing the requested data when completing the current form.

As discussed above, particular steps may be represented as a form field in the form. In this context, the form editing computer program can use predefined form field data which is stored in the data store to associate with a form field selected by the form creation user when designing the form. Additionally or alternatively, the form editing computer program can prompt the form creation user to input attributes to associate with the selected form field in the form. More specifically, example attributes include:

Field type value: Different field types can have different values of effort associated therewith. For example, a radio button group has a lower effort than a text field, because entering data into a radio button group is a simple single-click operation, whereas a text field requires the user to pop up the keyboard, and type the correct data into the field. Field type metrics can be predefined and stored in the data store.

Field length value: Text fields will have a different average number of characters that need to be typed. The more characters, generally the higher the effort. Fields such as radio buttons and checkboxes generally have an implied field length value of 1. The field length value is generally a number equal to or greater than 1. The user can define the average field value. Alternatively, the form editing computer program may determine an field length value based on a size of the graphical field which is drawn in the graphical user interface of the form editing computer program.

Mandatory: If a field is mandatory (and if it also cannot be hidden), then the occurrence will be set to 1 (i.e. this field should always presented to the form completion user). If the field is not mandatory, then the mandatory attribute is set to 0. The mandatory attribute is not directly used in calculations of the step effort metric, but is used to set the occurrence attribute to 1 which can directly impact upon calculation of the stage effort metric as will be discussed in more detail later.

Prefill occurrence value: This is a number which ranges between 1 and 0. The prefill occurrence attribute indicates the percentage of time that the particular field is pre-filled from information that can be derived from the user's identity, rather than requiring the user to enter such data explicitly via the form. If the field can always be prefilled, the prefill occurrence value will be set to 0. This implies no effort is required for this particular field. If the field can never be prefilled, then its prefill occurrence is set to 1. Numbers between 0 and 1 imply that this information can sometimes be prefilled, and other times not, and represent the average. The user is able to define the value of the prefill occurrence value or alternatively a plurality of example prefill occurrence values with corresponding data can be presented to the user based on historical values in order to allow the user to select one of the suggested values accordingly.

Information difficulty value: A number that indicates how difficult the piece of information requested in the form is to provide by the form completion user. Some types of information are easy to provide (e.g. a user's own name), whilst other types of information are harder to locate or provide due to this information needing to be located in records, etc. A piece of information which a form completion user is expected to know without reference to external documentation can be assigned an information difficulty value of 1, whereas more difficult information to locate can be assigned a higher information difficulty value. Again, example predefined information difficulty values stored in the data store for various types of information can be presented to the form creation user to allow for selection by the form creation user. Such predefined information difficulty values may be based on historical data.

For each step, the user can also define a step weighting. Each step weighting is used by the processing system 310 to adjust the step effort metric for the respective step when calculating a stage effort metric. In one form, a default value of 1 can be assigned for the step weighting when the form is initially created. However, it is also possible to adopt a step weighting based on historical data stored in the data store 315 based on the similarity of the respective step to another step in a previous form. The step weighting is stored in the data store 315 by the processing system 310. As will be discussed in further detail below, the step weighting can be adjusted during a fine-tuning stage of the method.

The processing system 310 can also optionally define a step occurrence attribute value at this stage of the method. In particular, the step occurrence can be a number that ranges between 0 and 1 which indicates how often a step occurs. In the event that the form creation user defines that a step is mandatory, as discussed above, the form editing computer program sets the step occurrence value to 1. In instances where the respective step is not mandatory, the step occurrence value will be left unassigned at this stage of the method, wherein once the form is launched in a production environment, the step occurrence value can be set based on user interaction data received from user interaction with the form. In particular, the processing system 310 can calculated based on the total number of presentation instances that the respective step and the total number of times the form is presented. Once calculated, the step occurrence value can be set accordingly. It will be appreciated that this value will typically adjust over time which is indicative of the varying number of times that a step is completed by form completing users.

Attribute values associated with each form field are stored in the data store 315.

As will be discussed in further detail later within this document, a step effort metric can be calculated by the processing system 310 for one or more steps once user interaction data has been received after the form has been released into a production environment. However, for particular steps, it may be possible to simply assign a step effort metric, particularly for steps where a form field cannot be used in the form. For example, a form may require a step requesting documentation to be attached to the form, the form creation user can provide input to assign a step effort for this step of the form. Similarly, for a payment stage of a form, payments may be made by check, BPAY, Credit Card, and other means, wherein each alternative for this step has a varying level of effort on behalf of the user. Example form steps and associated step effort metrics can be presented to the user which are based on historical data, wherein the form creation user can select an appropriate effort metric from the list of example step effort metrics for similar steps. Alternatively, the user can simply input a step effort metric for the associated step. Similarly to above, the step effort metrics for non-form field steps are stored in the data store.

The user can additionally define metadata associated with each stage defined in the stage definition data. In particular, the user can define one or more of the following attributes:

Mandatory: This is a number being set to equal 1 or 0, wherein 1 represents that the stage must be presented to the form completing user whereas a stage which is not mandatory is represented by a 0.

Stage occurrence value: This is a number between 0 and 1 that indicates how often this particular stage is presented to users. In the event that the mandatory attribute is set to 1. However, if the mandatory attribute is not set, the stage occurrence value may be left undefined until the form has been released into the production environment, wherein the stage occurrence value is determined by the processing system by measuring how often this particular stage occurs in the production environment.

Stage effort metric: In an optional form, the form creation user can define a stage effort metric which is indicative of the amount of effort required by the user to complete the respective stage of the form. This may be done based on the form creation user's past experience or a suggestion by the form editing computer program based on historical data. However, it is possible for the stage effort metric to be calculated by the processing system based on the summation of the step effort metrics associated with the respective stage. In this instance, as the stage effort metric may be left undefined until the form is released into the production environment.

Stage weighting. The weighting is used to adjust the effort metric of the respective stage. The default weighting is set to 1 by the processing system, but as will be appreciated, over time the weighting can be changed according to fine tuning The stage attribute values can be stored in the data store 315.

At step 520, the method 500 includes the user arranging for the form to be placed into a production environment. In this regard, users can access the form using their respective user device to complete the form. The form may be published in the form of a portable electronic document such as a PDF, a web-based form hosted by a server processing system such as HTML, or the like.

At step 525, the method 500 includes the processing system 310 receiving user interaction data indicative of one or more user's interactions with the form.

At step 530, the processing system 310 calculates one or more user interaction metrics based on the user interaction data. In particular, the one or more metrics include:

A completion rate (i.e. the number of users who complete the transaction divided by the number who begin).

An actual occurrence of each stage (per hundred transactions).

An actual occurrence of each step (per hundred transactions).

A median amount of time the user spent completing each step/stage.

An average number of times an error occurred with a particular step or stage, resulting in the user needing to re-attempt a step or a stage.

An average number of times (per hundred transactions) the user accessed an online help function associated with a particular step or stage.

An average number of occurrences (per hundred transactions) of a user abandoning the transaction while at a particular step or stage.

As will be appreciated, the actual occurrence of each stage and step can be used to store metadata in the data store 315 which is associated with the respective stages and steps.

At step 535, the method 500 includes calculating the effort metric for any steps of the form. As will be appreciated from above, it is possible that the form creation user has assigned a step effort metric with each step of the form, wherein this step would not be performed. However, in instances where a step effort metric was not assigned by the user, the processing system can calculate the step effort metric for the relevant steps of the form.

In particular, the processing system 310 can calculate a step effort metric for each relevant form field based on the stored attribute values associated with each form field of the form. The step effort metric is a numerical value that is indicative of the effort required to complete the respective step in the form. In one form, the step effort metric can be calculated according to Equation 1 shown below.

$$\text{Step Effort Metric} = FT \cdot FLF \cdot PFO \cdot ID \quad \text{(Equation 1)}$$

where:
FT is the field type effort value
FLF is the field length value
PFO is prefill occurrence value
ID is the information difficulty value The calculated step effort metric for each field form is then stored in the data store 315.

At step 540, the method 500 includes the processing system 310 calculating the stage effort metric of any relevant stages in the form. Similarly to step 535, in the event that the user has assigned a stage effort metric to each stage of the form, this step may not be performed. However, generally the user creation user will leave the stage effort metric to be calculated by the processing system 310 for at least one stage of the form. The processing system 310 calculates the stage effort metric for each relevant stage of the form according to Equation 2 shown below:

$$\text{Stage Effort Metric} = \sum_{j=1}^{n} O_i E_i W_i \quad \text{(Equation 2)}$$

where:

j is the step n is the number of steps in the respective stage

O is the occurrence value of the respective step

E is the step effort metric associated with the respective step

W is the weighting for the respective step

The processing system 310 stores the stage effort metric for each stage in the data store 315.

Figure 8:
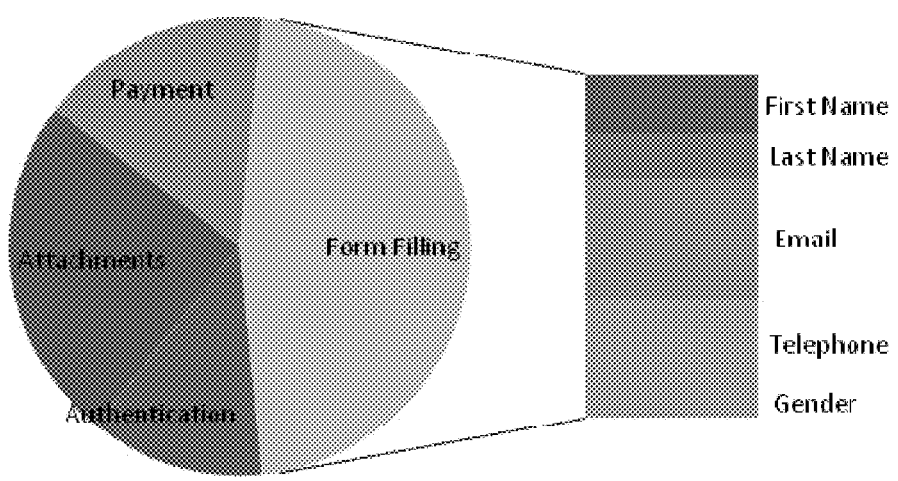
FIG. 8 is an example analytics interface output by the processing system.

At step 545, the method 500 includes the processing system 310 calculating and storing in the data store 315 an overall transaction effort metric for the form-based transaction which is represented by Equation 3 shown below:

$$\text{Total Effort Metric} = \sum_{i=1}^{n} O_i E_i W_i \quad \text{(Equation 3)}$$

where:
 i is the stage;
 n is the total number of stages;
 O is the occurrence metadata value for the respective stage;
 E is the stage effort metric for the respective stage;
 W is the weighting for the respective stage;

At step 550, the method 500 includes fine tuning one or more of the metadata attributes associated with various portions of the form. In one form, the various metrics can be determined based on user interaction data collected over a period of time and presented by the processing system 310 as part of an intuitive dashboard alongside definitions of the stages and steps of the form. The dashboard interface can provide a drill-down activity. A sample of this dashboard capability is shown in FIG. 8. This information will be used by an information analyst to fine-tune the weighting and difficulty metrics for each step and stage. Whenever the weightings or difficulty metrics are adjusted, the previous calculations are re-evaluated, otherwise the interpretation of the data will not be based on comparable data. In another form, the fine tuning process may be an automated process performed by the processing system 310.

At step 555, the method 500 includes determining one or more modifications to the form. In one form, the processing system 310 can present an analytics dashboard that allows an information analyst to determine the stages and steps that contribute the greatest effort to the overall transaction. The processing system 310 can be configured to then make recommendations regarding one or more modifications to the form in an attempt to reduce the effort by form completing users. In one form, a rule-based component defining one or more rules regarding acceptable modifications can be used by the processing system to determine acceptable modifications to the form. Examples of recommendations can include:
 Consider removing field X.
 Consider making field Y non-mandatory.
 Consider allowing users to provide the information associated with stage A at a later stage, instead of forcing them to provide it as part of the initial transaction.

At step 560, the method 500 includes implementing the modification to the form. The modification may be implemented by the processing system 310 automatically. Alternatively, the form creation user may interact with the form editing computer program executing upon the processing system 310 to implement the change to the form.

At step 565, the method 500 includes the processing system 310 receiving user interaction data and calculating various metrics and total, stage and step effort metrics. This step is performed similarly to steps 530 to 545.

Figure 9:
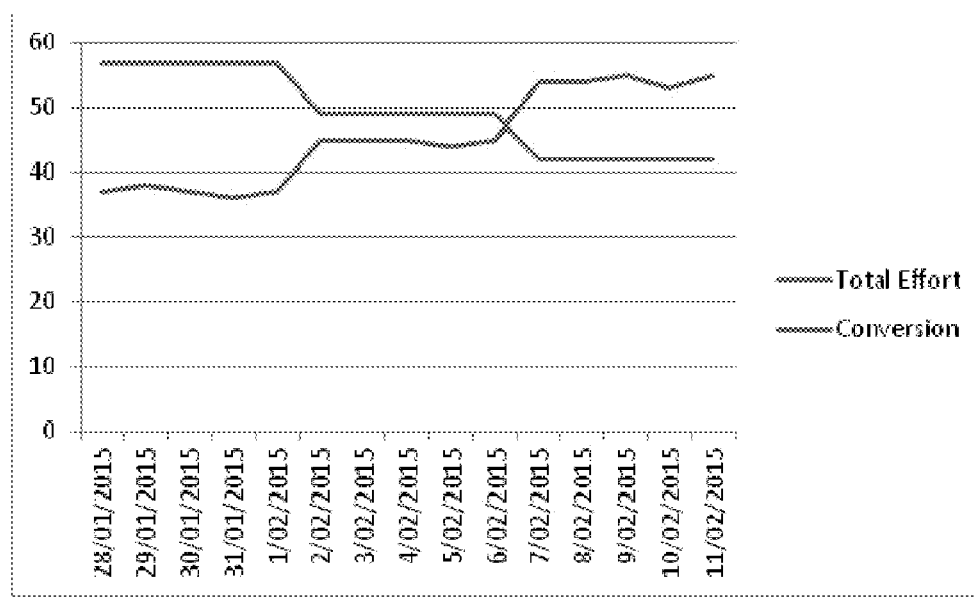
FIG. 9 is an example graph generated by the processing system showing total user effort versus conversion rates over time.

At step 570, the method 500 includes the processing system 310 generating comparative data to determine whether the modification to the form resulted in an improvement in the form being completed. In one form, a graph is generated which depicts form conversion versus effort which is presented via the processing system. The graph can also contain the dates on which suggestions were implemented. The graph can be output via a screen for review by a user of the processing system 310. An example graph is shown in FIG. 9.

At step 575, the method 500 includes determining whether the modification resulted in improved completion. In the event that the modification did not result in an improvement, the modification is reverted at step 580 and then proceeds to step 585. Otherwise, the method proceeds to step 585.

At step 585, the method includes determining whether further improvement can be achieved to the conversion rate. This determination may be determined by the processing system or alternatively by a user operating the processing system. In the event that further improvement cannot be achieved, the method ends. However, in the event that further improvement can be achieved, the method proceeds back to step 555. As such, a number of modifications to the form may be implemented to optimize the form such as to achieve an optimized conversion rate in relation to the users completing the form.

Figure 10:
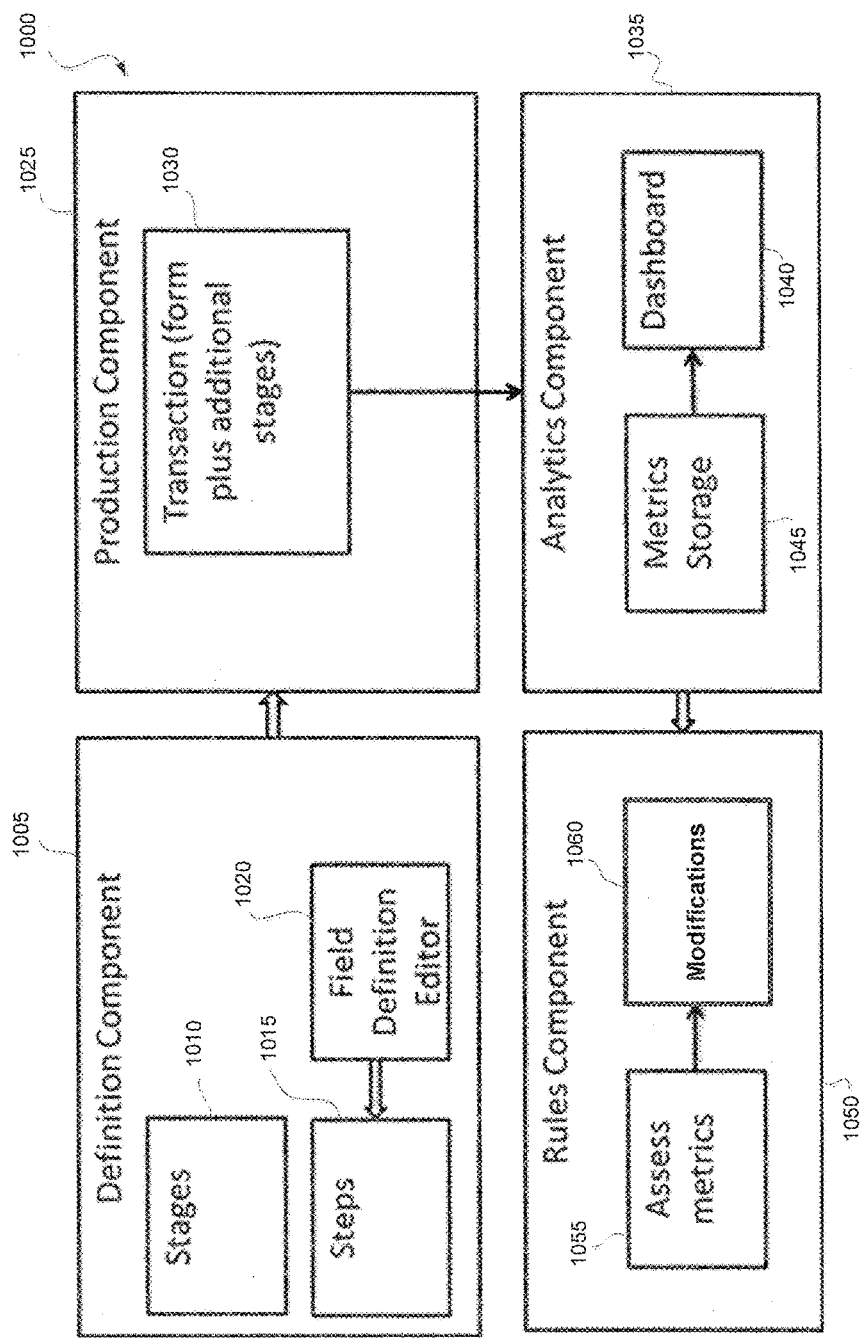
FIG. 10 is a functional block diagram representing a software system for modifying forms.

Referring to FIG. 10 there is shown a functional block diagram representing a software system 1000 including a plurality of software components executable by the processing system 310 for performing the method of FIG. 5. In particular, the software system 1000 includes a definition component 1005, a production component 1025, an analytics component 1035 and a rules component 1050. The definition component 1005 is configured to enable the form creation user to define stages 1010 and steps 1015 of the form. In one form, the definition component 1005 can include a form definition editor 1020 which can be used to define metadata attributes of form fields when designing the form.

The production component which is configured to generate the form 1030 enable a transaction with users of user devices 320, wherein user interaction data is collected.

User interaction data is then transferred to the analytics component 1035 which is configured to generate and store metrics in a metrics storage component 1045 and generate the one or more dashboard interfaces 1040 for presentation to one or more users of the processing system 310. Output from the analytics component 1035 is then transferred to the rules component 1050 which is configured to assess the metrics provided by the analytics component 1035 and generate one or more recommended modifications 1060 to optimize the conversion rate of the form. The rules component 1050 can be configured to prioritize the one or more modifications 1060 according to one or more priorities stored in the data store 315 accordingly in order to determine which modification 1060 to initiate prior to others.

Many modifications within the scope of the invention will be appreciated by those skilled in the art without department from the spirit of the invention.

What is claimed is:

1. A method performed by a processing system including:
 receiving form stage definition data a sequence of stages that are presentable within the form;

receiving form step definition data indicative of a series of steps to be executed by a user completing the form for each stage of the form;

storing the form stage definition data and the form step definition data in a data store;

receiving and storing in the data store one or more attribute values defined for one or more form fields of the form, each form field representing one of the steps and associated with one of the stages of the form, wherein the one or more attribute values include at least one of: a field type value; a field length value indicative length of the field; a mandatory value indicative of whether the field needs to be completed in order to submit the form; a prefill occurrence value indicative of the likelihood that field is prefillable; and an information difficulty value indicative of the difficulty of providing information requested for field;

transferring form data indicative of at least part of a form to a plurality of user devices;

receiving, from the plurality of user devices, user interaction data indicative of user interaction with at least part of the form, wherein the user interaction data is stored in a data store;

analyzing the user interaction data to determine a user effort metric in relation to user interaction with at least part of the form, where the user effort metric is determined using at least some of the one or more attributes; and outputting, based on the user effort metric, one or more recommended modifications to the form.

2. The method according to claim 1, wherein the method includes:
associating metadata stored in the data store with the respective form stages and steps of the form.

3. The method according to claim 2, wherein the stages and steps of the form are be defined in XML, wherein the XML includes at least one XML tag associating at least some of the meta-data stored in the data store with at least some of the form stages and the form steps.

4. The method according to claim 1, wherein the method includes:
calculating for at least some of the steps of the form a respective step effort value, wherein each calculated step effort value is calculated based upon at least some of the one or more attribute values that are stored in the data store;

calculating for at least some of the stages of the form a stage effort value, wherein each stage effort value of each respective stage is calculated based upon the respective step effort value of each fields of the respective stage and at least some of the user interaction data; and calculating the user effort metric based upon the respective stage effort values of each stage of the form.

5. The method according to claim 4, wherein the step effort metric is calculated according to:

$$\text{Step Effort Metric} = FT \cdot FLF \cdot PFO \cdot ID.$$

where:
FT is the field type effort value;
FLF is the field length value;
PFO is the prefill occurrence value; and
ID is the information difficulty value.

6. The method according to claim 4, wherein the calculating of each stage effort step is based upon a weighted sum of the one or more step effort values, wherein at least some of the step effort values are weighted according a step weight value stored in the data store.

7. The method according to claim 4, wherein the calculating of each stage effort step is based upon a number of occurrences which each step of the respective stage has been presented to a form completing user.

8. The method according to claim 4, wherein each stage effort metric is calculated according to:

$$\text{Stage Effort Metric} = \sum_{j=1}^{n} O_i E_i W_i$$

where:
j is a step;
n is a number of steps in the respective stage;
O is an occurrence value of the respective step;
E is the step effort metric associated with the respective step; and
W is a weighting for the respective step.

9. The method according to claim 4, wherein the calculating of the user effort metric is based upon a weighted sum of the one or more stage effort values, wherein at least some of the stage effort values are weighted according a stage weight value stored in the data store.

10. The method according to claim 4, wherein the calculating of the user effort metric is based upon a number of occurrences which each stage of the respective stage has been presented to a form completing user.

11. The method according to claim 4, wherein the user effort metric is calculated according to:

$$\text{User Effort Metric} = \sum_{i=1}^{n} O_i E_i W_i$$

where:
i is a stage number;
n is a total number of stages;
O is an occurrence metadata value for the respective stage;
E is the stage effort metric for the respective stage; and
W is the weighting for the respective stage.

12. The method according to claim 1, wherein the method includes applying one or more rules defining one or more acceptable modifications to automatically determine the one or more recommended modifications to the form.

13. The method according to claim 1, wherein the method includes the processing system automatically implementing the one or more modifications to the form.

14. The method according to claim 1, wherein the method includes:
implementing the one or more modifications to the form thereby generating the modified form
determining a user effort metric for the modified form;
comparing the user effort metric for the form and the user effort metric for the modified form, and
in the event that the user effort metric of the modified form has not improved compared to the form, reverting the one or more modifications to the form.

15. A processing system including a processor and memory, wherein the processor is configured to:
receive form stage definition data defining a sequence of stages that are presentable within the form;

receive form step defining data indicative of a series of steps to be executed by a user completing the form for each stage of the form;

store the form stage definition data and the form step definition data in a data store;

receive and store in the data store one or more attribute values defined for one or more form field of the form, each form field representing one of the steps and associated one of the stages of the form, wherein the one or more attribute values include at least one of: a field type value; a field length value indicative of a textual length of the field; a mandatory value indicative of whether the field needs to be completed in order to submit the form; a prefill occurrence value indicative of the likelihood that field is prefillable; and an information difficulty value indicative of the difficulty of providing information requested for the field;

transfer form data indicative of at least part of a form to a plurality of user devices;

receive, from the plurality of user devices, user interaction data indicative of user interaction with at least part of the form, wherein the user interaction data is stored in a data store;

analyze the user interaction data to determine a user effort metric in relation to user interaction with at least part of the form, wherein the user effort metric is determined using at least some one or more attributes; and output, based on the user effort metric, one or more recommended modifications to the form.

16. The processing system according to claim 15, wherein the processor is configured to:

calculate for at least some of the steps of the form a respective step effort value, wherein each calculated step effort value is calculated based upon at least some of the one or more attribute values that are stored in the data store;

calculate for at least some of the stages of the form a stage effort value, wherein each stage effort value of each respective stage is calculated based upon the respective step effort value of each fields of the respective stage and at least some of the user interaction data; and calculate the user effort metric based upon the respective stage effort values of each stage of the form.

17. The processing system according to claim 16, wherein the step effort metric is calculated according to:

$$\text{Step Effort Metrtc} = FT \cdot FLF \cdot PFO \cdot ID$$

where:
FT is the field type effort value;
FLF is the field length value;
PFO is prefifi occurrence value; and
ID is the information difficulty value.

18. The processing system according to claim 16, wherein each stage effort metric is calculated according to:

$$\text{Stage Effort Metric} = \sum_{j=1}^{n} O_i E_i W_i$$

where:
j is a step;
n is a number of steps in the respective stage;
O is an occurrence value of the respective step;
E is the step effort metric associated with the respective step; and
W is a weighting for the respective step.

19. The processing system according to claim 16, wherein the processor is configured to calculate the user effort metric according to:

$$\text{User Effort Metric} = \sum_{i=1}^{n} O_i E_i W_i$$

where:
i is a stage number;
n is a total number of stages;
O is an occurrence metadata value for the respective stage;
E is the stage effort metric for the respective stage; and
W is the weighting for the respective stage.

20. A non-transient computer readable medium including program instructions for configuring a processing system to:

receive form stage definition data defining a sequence of stages that are presentable with the form;

receive form step definition data indicative of a series of steps to be executed by a user completing the form for each stage of the form;

store the form stage definition data and the form step definition data store;

receive and store in the data store customisation data including one or more attribute values defined for one or more form fields of the form, each form field representing one of the steps and associated with one of the stages of the form, wherein the one or more attribute values include at least one of: a field type value; a field length value indicative of a textual length of the field; a mandatory value indicative of whether the field needs to be complete in order to submit the form; a prefill occurrence value indicative of the likelihood that prefillable; and an information difficulty value indicative of the difficulty of providing information requested for the field;

transfer form data indicative of at least part of a form to a plurality of user devices;

receive, from the plurality of user devices, user interaction data indicative of user interaction with at least part of the form;

analyze the user interaction data to determine a user effort metric in relation to user interaction with at least part of the form, wherein the user interaction data is stored in a data store, wherein the user effort metric is determined using at least some of the one or more attributes; and output, based on the user effort metric, one or more recommended modifications to the form.

21. The non-transient computer readable medium according to claim 20, wherein the program instructions configure the processing system to:

calculate for at least some of the steps of the form a respective step effort value, wherein each calculated step effort value is calculated based upon at least some of the one or more attribute values that are stored in the data store;

calculate for at least some of the stages of the form a stage effort value, wherein each stage effort value of each respective stage is calculated based upon the respective step effort value of each fields of the respective stage and at least some of the user interaction data; and calculate the user effort metric based upon the respective stage effort values of each stage of the form.

22. The non-transient computer readable medium according to claim 21, wherein the step effort metric is calculated according to:

$$\text{Step Effort Metric} = FT \cdot FLF \cdot PFO \cdot ID$$

where:
- FT is the field type effort value;
- FLF is the field length value;
- PFO is prefill occurrence value; and
- ID is the information difficulty value.

23. The non-transient computer readable medium according to claim 21, wherein each stage effort metric is calculated according to:

$$\text{Stage Effort Metric} = \sum_{j=1}^{n} O_i E_i W_i$$

where:
- j is a step;
- n is a number of steps in the respective stage;
- O is an occurrence value of the respective step;
- E is the step effort metric associated with the respective step; and
- W is a weighting for the respective step.

24. The non-transient computer readable medium according to claim 21, wherein the user effort metric is calculated according to:

$$\text{User Effort Metric} = \sum_{i=1}^{n} O_i E_i W_i$$

where:
- i is a stage number;
- n is a total number of stages;
- O is an occurrence metadata value for the respective stage;
- E is the stage effort metric for the respective stage; and
- W is the weighting for the respective stage.

* * * * *